(12) United States Patent
Deetjen

(10) Patent No.: US 10,098,444 B1
(45) Date of Patent: Oct. 16, 2018

(54) PHONE SECURITY CASE WITH EJECTION MECHANISM

(71) Applicant: Bengy Deetjen, Riviera Beach, FL (US)

(72) Inventor: Bengy Deetjen, Riviera Beach, FL (US)

( * ) Notice: Subject to any disclaimer, the term of this patent is extended or adjusted under 35 U.S.C. 154(b) by 0 days.

(21) Appl. No.: 15/716,917

(22) Filed: Sep. 27, 2017

(51) Int. Cl.
*A45F 5/00* (2006.01)
*A45F 5/02* (2006.01)
*H04B 1/3888* (2015.01)
*H04M 1/02* (2006.01)

(52) U.S. Cl.
CPC ........... *A45F 5/021* (2013.01); *H04B 1/3888* (2013.01); *H04M 1/0202* (2013.01); *A45F 2005/002* (2013.01); *A45F 2200/0516* (2013.01)

(58) Field of Classification Search
CPC .................... A45F 5/021; A45F 2200/0516
USPC .................................. 224/196, 930
See application file for complete search history.

(56) References Cited

U.S. PATENT DOCUMENTS

| | | | | |
|---|---|---|---|---|
| 5,174,482 A | * | 12/1992 | Rogers | F42B 39/02 221/185 |
| 5,230,016 A | * | 7/1993 | Yasuda | H02J 7/0044 379/426 |
| 5,825,874 A | * | 10/1998 | Humphreys | B60R 11/0241 379/446 |
| 5,940,502 A | * | 8/1999 | Hirai | B60R 11/0241 379/446 |
| 6,084,963 A | * | 7/2000 | Hirai | B60R 11/0241 379/446 |
| 6,095,470 A | * | 8/2000 | Kalis | B60R 11/02 248/309.1 |
| D460,962 S | * | 7/2002 | Peiker | D14/253 |
| 8,700,107 B1 | | 4/2014 | Oh et al. | |
| 8,744,540 B2 | * | 6/2014 | Tomasini | H04M 1/04 455/569.2 |
| 8,760,294 B2 | * | 6/2014 | Pertuit | G01R 33/0023 340/568.1 |
| 9,294,601 B2 | | 3/2016 | Hammond et al. | |
| 9,389,641 B2 | * | 7/2016 | Jayetileke | A45C 11/00 |
| 2003/0047575 A1 | * | 3/2003 | Enkerlin | A45F 5/02 224/271 |
| 2006/0022822 A1 | * | 2/2006 | Wong | A45F 5/02 340/568.1 |
| 2007/0054555 A1 | * | 3/2007 | Yeh | A45F 5/00 439/607.05 |

* cited by examiner

*Primary Examiner* — Justin Larson

(57) ABSTRACT

A phone security case with ejection mechanism having a case body, a pair of support arms, and a swivelable belt clip disposed on the case body. An ejection mechanism, a central processing unit, a tethering mechanism, a message sensor mechanism, a rechargeable battery, and a speaker are also disposed on the case body.

1 Claim, 5 Drawing Sheets

PHONE SECURITY CASE WITH EJECTION MECHANISM

BACKGROUND OF THE INVENTION

Various types of condiment dispensers are known in the prior art. What is needed, and what the present phone security case with ejection mechanism provides, is a convenient way to transport and store a cellular phone. Unlike other phone security cases, the present phone security case with ejection mechanism allows a user to both easily store and access the phone in the event of incoming calls and text messages. Furthermore, a tethering mechanism and a message sensor mechanism allows the phone to readily alert the user if the phone travels outside of a given radius or if the user receives an incoming call or text message.

FIELD OF THE INVENTION

The present invention relates to condiment dispensers, and more particularly, to a phone security case with ejection mechanism.

SUMMARY OF THE INVENTION

The general purpose of the present phone security case with ejection mechanism, described subsequently in greater detail, is to provide a phone security case with ejection mechanism that has many novel features that result in a phone security case with ejection mechanism that is not anticipated, rendered obvious, suggested, or even implied by prior art, either alone or in combination thereof.

To accomplish this, the present phone security case with ejection mechanism includes a tubular body having a case body. The case body has a front side, a back side, a pair of side edges, a top side, and a bottom lip having a cavity. One of a pair of support arms is disposed on one of the pair of side edges. The pair of support arms secures a screen side of a cellphone held in the phone security case. A swiveable belt clip is disposed on the back side of the case body. There is an ejection mechanism disposed on at least one of the bottom lip and the front side of the case body. One embodiment of the ejection mechanism has an ejection base, a track, and a spring mechanism. The spring mechanism can propel the ejection base along the track to push the cellphone toward the top side of the phone security case.

A CPU is disposed within the bottom lip, and the CPU is in operational communication with the ejection mechanism. A tethering mechanism disposed within the cavity of the bottom lip is in operational communication with the CPU and the cellphone. A message sensor mechanism is disposed within the cavity of the bottom lip, with the message sensor mechanism in operational communication with the CPU. Furthermore, a rechargeable battery is disposed within the cavity of the bottom lip, with the rechargeable battery in operational communication with the CPU. A speaker is also disposed within the cavity of the bottom lip, with the speaker in operational communication with the CPU. The speaker is configured to emit a loud alarm when a location sensor disposed within the CPU travels in a maximum range of ten to twenty feet within a radius of the phone. Additionally, the message sensor mechanism is configured to notify a user if the phone was unintentionally left behind.

Thus have been broadly outlined the more important features of the present phone security case with ejection mechanism so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
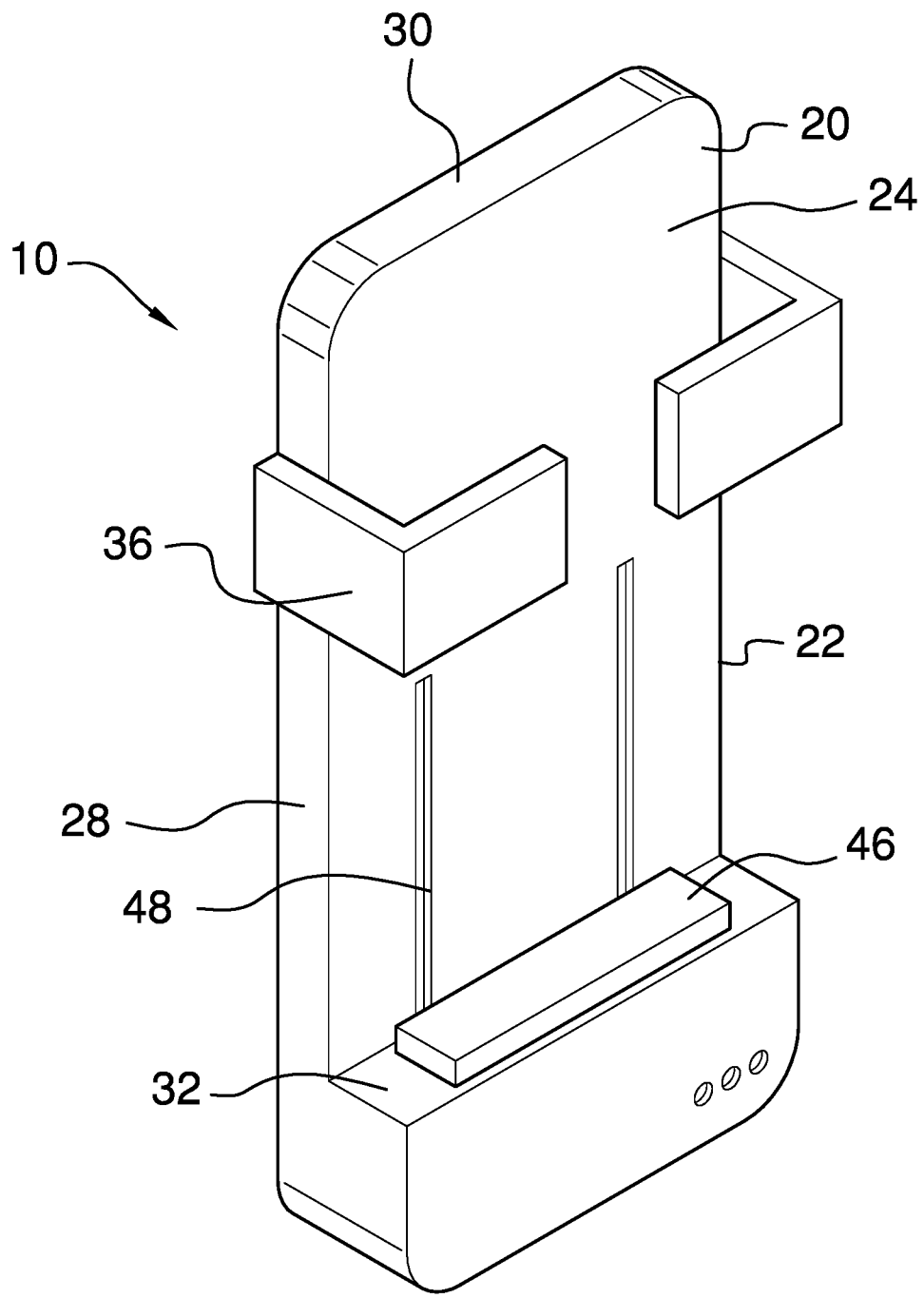
FIG. 1 is an isometric view of a phone security case with ejection mechanism.
Figure 2:
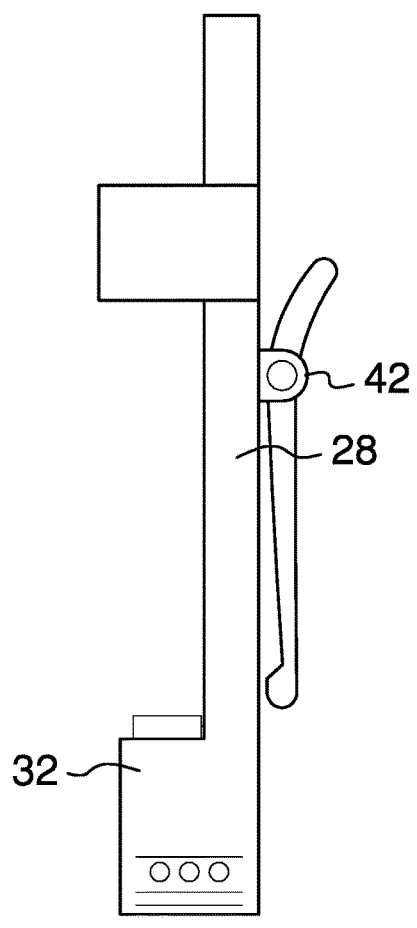
FIG. 2 is side elevation view of the phone security case with ejection mechanism.
Figure 3:
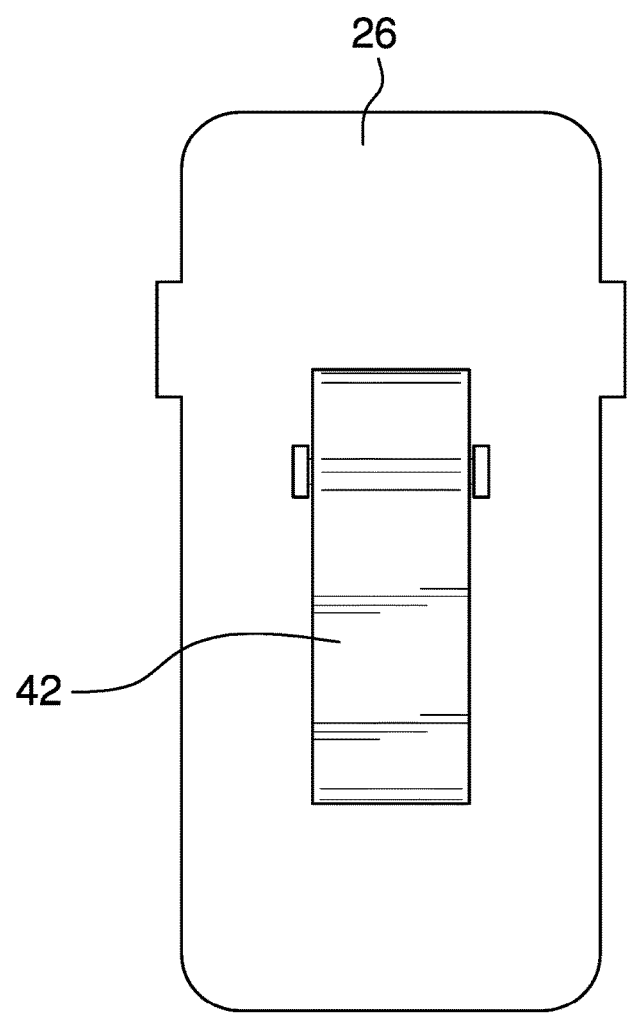
FIG. 3 is a rear elevation view of the phone security case with ejection mechanism.
Figure 4:
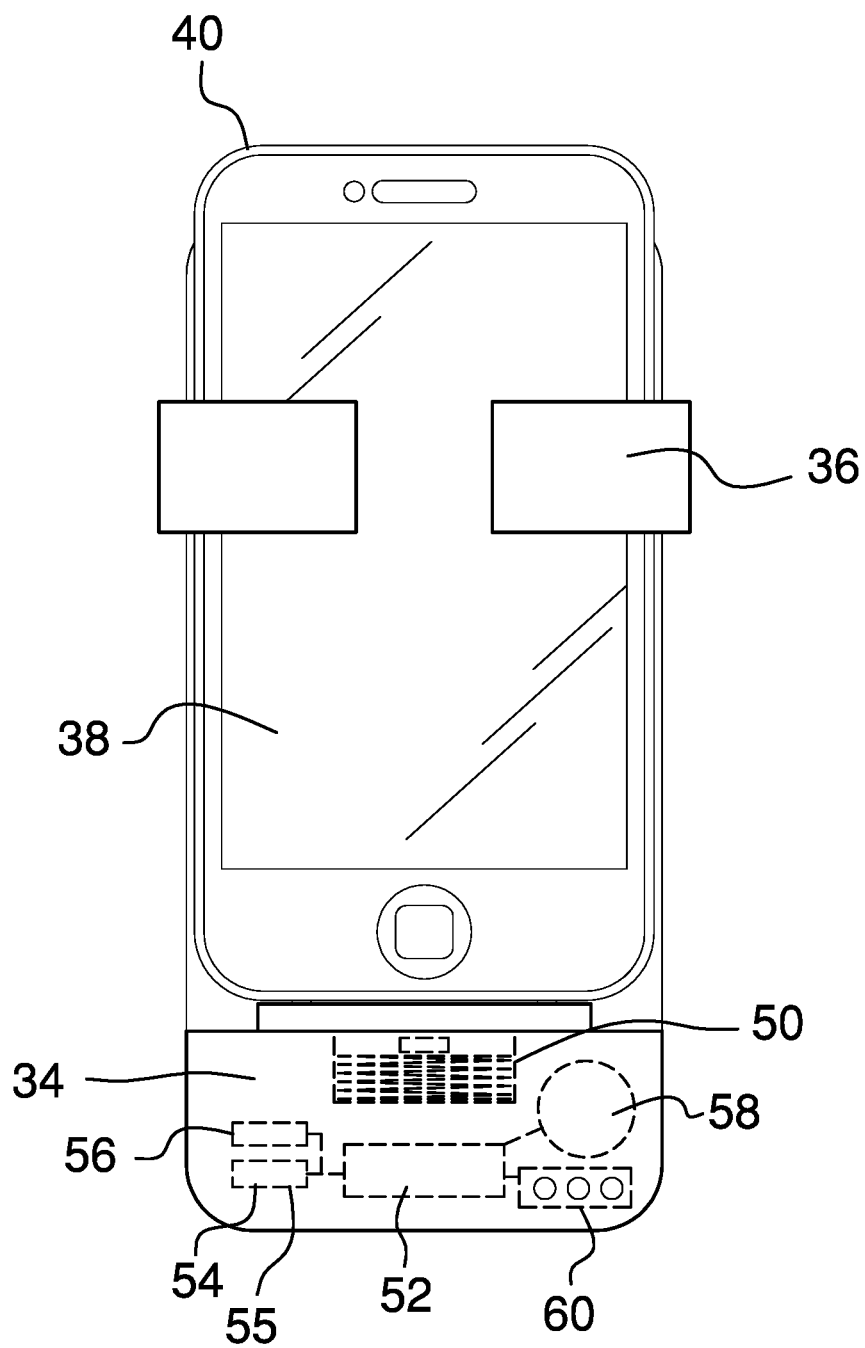
FIG. 4 is a front elevation view of the phone security case with ejection mechanism.
Figure 5:
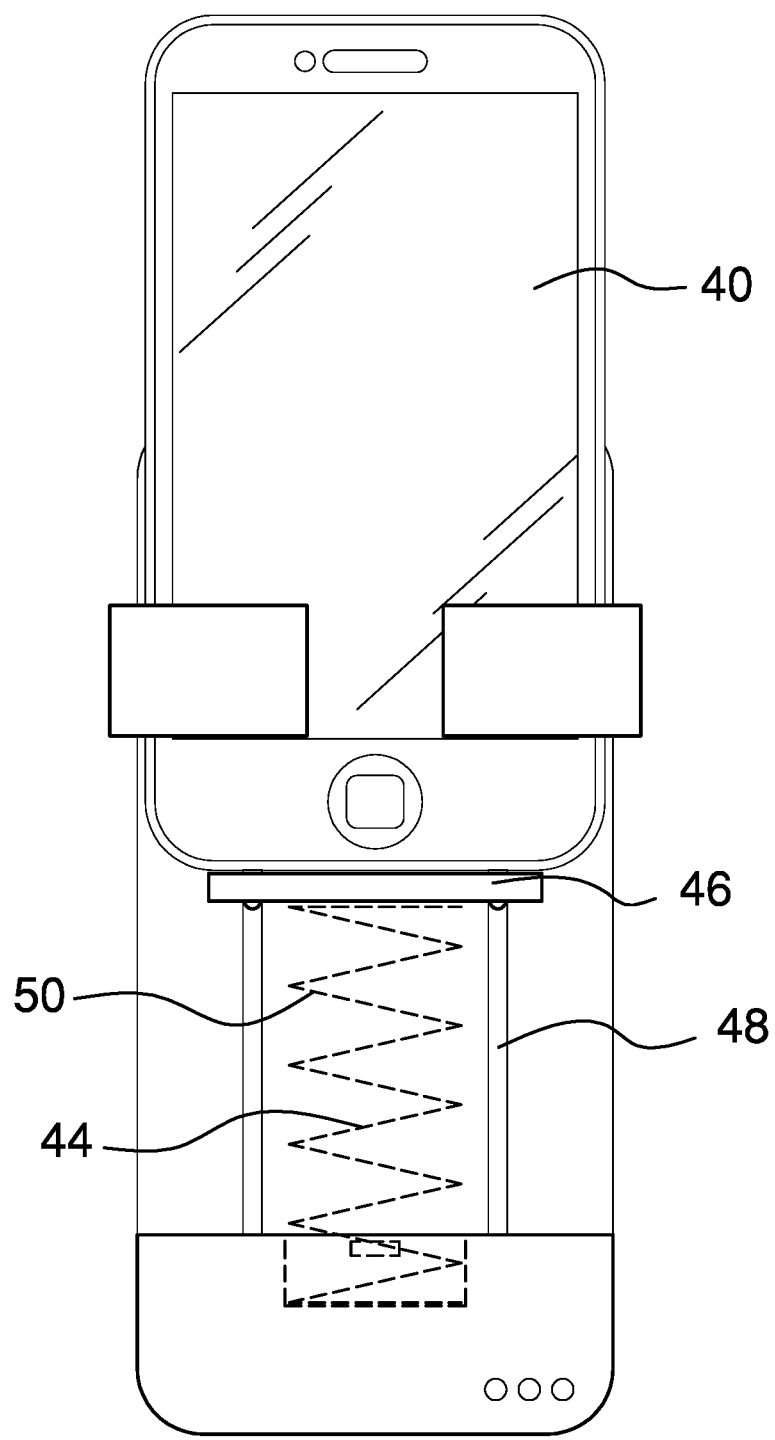
FIG. 5 is a front elevation view of the phone security case with ejection mechanism showing the ejection mechanism in phantom.
Figure 6:
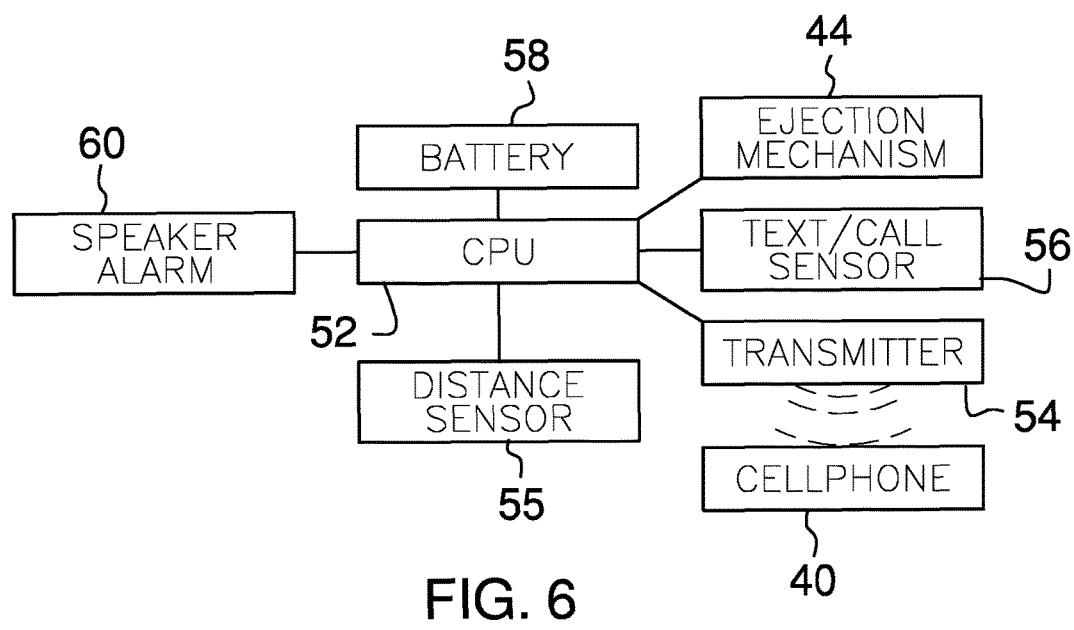
FIG. 6 is block diagram of the phone security case with ejection mechanism.

With reference now to the drawings, and in particular FIGS. 1 through 6 thereof, an example of the instant phone security case with ejection mechanism employing the principles and concepts of the present phone security case with ejection mechanism and generally designated by the reference number 10 will be described.

Referring to FIGS. 1 through 6 the present phone security case with ejection mechanism 10 is illustrated. The phone security case with ejection mechanism 10 includes a tubular body 20 having a case body 22. The case body 22 has a front side 24, a back side 26, a pair of side edges 28, a top side 30, and a bottom lip 32 having a cavity 34. One of a pair of support arms 36 is disposed on one of the pair of side edges 28. The pair of support arms 36 secures a screen side 38 of a cellphone 40 held in the phone security case. A swiveable belt clip 42 is disposed on the back side 26 of the case body 22. There is an ejection mechanism 44 disposed on at least one of the bottom lip 32 and the front side 24 of the case body 22. An embodiment of the ejection mechanism has an ejection base 46, a track 48, and a spring mechanism 50. The spring mechanism 50 can propel the ejection base 46 along the track 48 to push the cellphone toward the top side 30 of the phone security case.

A CPU 52 is disposed within the bottom lip 32, and the CPU 52 is in operational communication with the ejection mechanism 44. A tethering mechanism 54 disposed within the cavity 34 of the bottom lip 32 is in operational communication with the CPU 52 and the cellphone. A message sensor mechanism 56 is disposed within the cavity 34 of the bottom lip 32, with the message sensor mechanism 56 in operational communication with the CPU 52. Furthermore, a rechargeable battery 58 is disposed within the cavity 34 of the bottom lip 32, with the rechargeable battery 58 in operational communication with the CPU 52. A speaker 60 is also disposed within the cavity 34 of the bottom lip 32, with the speaker 60 in operational communication with the CPU 52.

What is claimed is:

1. A phone security case with ejection mechanism comprising:
   a case body having a front side, a back side, a pair of side edges, a top side, and a bottom lip having a cavity;
   a pair of support arms, wherein one of the support arms is disposed on one of the pair of side edges;

a swivelable belt clip disposed on the back side of the case body;
an ejection mechanism disposed on at least one of the bottom lip and the front side of the case body;
a CPU disposed within the bottom lip, wherein the CPU is in operational communication with the ejection mechanism;
a tethering mechanism disposed within the cavity of the bottom lip, wherein the tethering mechanism is in operational communication with the CPU and a cellphone;
a message sensor mechanism disposed within the cavity of the bottom lip, wherein the message sensor mechanism is in operational communication with the CPU;
a rechargeable battery disposed within the cavity of the bottom lip, wherein the rechargeable battery is in operational communication with the CPU;
a speaker disposed within the cavity of the bottom lip, wherein the speaker is in operational communication with the CPU.

* * * * *